(12) United States Patent
Moonen (10) Patent No.: US 9,950,304 B2
(45) Date of Patent: Apr. 24, 2018

(54) SYSTEM AND METHOD FOR OPERATING PARALLEL REACTORS

(71) Applicant: Avantium Technologies B.V., Amsterdam (NL)

(72) Inventor: Roelandus Hendrikus Wilhelmus Moonen, Amsterdam (NL)

(73) Assignee: Avantium Technologies B.V., Amsterdam (NL)

( * ) Notice: Subject to any disclaimer, the term of this patent is extended or adjusted under 35 U.S.C. 154(b) by 0 days.

(21) Appl. No.: 14/435,206

(22) PCT Filed: Oct. 11, 2013

(86) PCT No.: PCT/NL2013/050723
§ 371 (c)(1),
(2) Date: Apr. 13, 2015

(87) PCT Pub. No.: WO2014/062055
PCT Pub. Date: Apr. 24, 2014

(65) Prior Publication Data
US 2016/0121291 A1 May 5, 2016

Related U.S. Application Data

(60) Provisional application No. 61/715,544, filed on Oct. 18, 2012.

(30) Foreign Application Priority Data

Oct. 18, 2012 (NL) ...................................... 2009659

(51) Int. Cl.
*B01J 19/00* (2006.01)
*B01J 19/24* (2006.01)

(52) U.S. Cl.
CPC ....... *B01J 19/0006* (2013.01); *B01J 19/0046* (2013.01); *B01J 19/0093* (2013.01);
(Continued)

(58) Field of Classification Search
CPC .... B01J 19/00; B01J 19/0006; B01J 19/0046; B01J 19/0093;
(Continued)

(56) References Cited

U.S. PATENT DOCUMENTS 5,503,803 A * 4/1996 Brown .............. B01L 3/502723
422/430
7,122,156 B2 * 10/2006 Bergh ........................ B01J 4/00
422/129
2013/0273662 A1 10/2013 Lange De Oliveira et al.

FOREIGN PATENT DOCUMENTS

EP          1888224        2/2008
WO     99/64160 A1      12/1999
(Continued)

OTHER PUBLICATIONS

Perez-Ramirez J. et al.: "The Six-Flow Reactor Technology a Review on Fast Catalyst Screening and Kinetic Studies", Catalysis Today, Amsterdam, NL, vol. 60, No. 1/02, Jul. 1, 2000.
(Continued)

*Primary Examiner* — Natasha Young
(74) *Attorney, Agent, or Firm* — Hoffmann & Baron, LLP (57) ABSTRACT

A system for operating parallel reactors includes a plurality of reactor assemblies, each reactor assembly including: a flow-through reactor, a reactor feed line, a reactor effluent line, a primary fluid source, and a flow splitter which is arranged downstream of the primary fluid source and upstream of the reactor assemblies. All passive flow restrictors have an substantially equal resistance to fluid flow. A feed line pressure measurement device and a pressure con-
(Continued)

trol arrangement controls backpressure regulators such that the measured feed line pressure becomes substantially the same as a feed line pressure setpoint in the reactor assemblies.

12 Claims, 4 Drawing Sheets

(52) U.S. Cl.
CPC ............... *B01J 2219/00286* (2013.01); *B01J 2219/00585* (2013.01); *B01J 2219/00689* (2013.01); *B01J 2219/00698* (2013.01); *B01J 2219/00747* (2013.01); *B01J 2219/00869* (2013.01); *B01J 2219/00891* (2013.01); *B01J 2219/00963* (2013.01)

(58) Field of Classification Search
CPC .............. B01J 2219/00274–2219/00281; B01J 2219/00286; B01J 2219/00583; B01J 2219/00585; B01J 2219/0068; B01J 2219/00686; B01J 2219/00698; B01J 2219/00718; B01J 2219/00745; B01J 2219/00747; B01J 2219/00851; B01J 2219/00869; B01J 2219/00891; B01J 2219/0095–2219/00954; B01J 2219/00963; B01J 19/24

See application file for complete search history.

(56) References Cited

FOREIGN PATENT DOCUMENTS

| WO | 03/067354 A1 | 8/2003 |
| WO | 2006/107187 A1 | 10/2006 |
| WO | 2012/047095 A1 | 4/2012 |
| WO | 2012/052149 A2 | 4/2012 |

OTHER PUBLICATIONS

"Parr Tubular reactor Systems 5400", Sales Brochure, Aug. 26, 2010, Retrieved from the Internet: URL: http://www.parrinst.com/wp-content/uploads/downloads/2011/09/5400MB_Parr_Tubular-Reactor-Systems-Literature. pdf.

* cited by examiner

SYSTEM AND METHOD FOR OPERATING PARALLEL REACTORS

CROSS-REFERENCE TO RELATED APPLICATIONS

This application is the National Stage of International Application No. PCT/NL2013/50723, now WO 2014/062055, filed Oct. 11, 2013, which claims the benefit of U.S. Provisional Application No. 61/715,544 filed Oct. 18, 2012, and the benefit of Netherlands Application No. NL 2009659, filed Oct. 18, 2012, the contents of all of which are incorporated by reference herein.

FIELD OF THE INVENTION

The invention pertains to a system and method for operating parallel reactors, in particular in relation to flow distribution and pressure control in such a system and method.

BACKGROUND OF THE INVENTION

Parallel reactors are widely used in research into chemical reactions, in particular for high throughput experimentation. In high throughput experimentation, a plurality of relatively small scale reactors is arranged in parallel. In each reactor, a different experiment takes place. Usually, conditions and/or reactants are varied slightly over the different reactors. For example all reactors are operated at the same pressure and temperature, but all contain a different reactant. After the experiments are carried out, the results of the experiments are compared with each other, and for example interesting reactants (e.g. catalysts) are identified. Carrying the experiments out in parallel leads to a significant reduction in the time it takes to come up with experimentation results.

Usually, in high throughput experimentation, the reactors are small, as are the amounts of reactants that are used. Often, flow through reactors are used, and the flow rates of the fluid flows are also low. Typical reactor sizes do not exceed 1 cm in diameter, and when for example catalytic activity is tested, typically a few grams of a potential catalyst are present in each reactor. Sometimes even less potential catalyst is used, e.g between 0.005 and 1 gram. Flow rates are usually less then 10 ml/hour for the combined fluid flow from the source to the reactors for liquids, often even 10 μl/hour or less for the liquid flow through a single reactor, and/or less than 150 Nml/minute for gas flow. The typical low flow rate used in high throughput reactions makes controlling the fluid flow through the individual reactors hard.

In order to be able to compare the results of the experiments that are carried out in the different reactors with each other, it is important to accurately control the process conditions of each experiment. Such process conditions include e.g. temperature, pressure and flow rate.

A different use of parallel reactors in chemistry is production of chemical compounds using microreactors. Microreactors are of similar size or slightly larger than the reactors used in high throughput experimentation. When it has been proven that a certain compound can be produced at a small scale, using a micro reactor, a plurality of such micro reactors is arranged in parallel. The compound is then produced in these microreactors, using the same reaction conditions as in the original, single reactor.

One way of controlling the flow rate to the individual reactors is the use of active flow controllers, e.g. needle valves. Active flow controllers are flow controllers that allow the flow rate to be changed during an experiment, for example by adjusting the resistance to fluid flow of the flow controller during the experiment. This is contrary to passive flow controllers such as capillaries that are operated at a constant temperature, which have a fixed resistance to fluid flow.

However, active flow controllers have several disadvantages. Active flow controllers are generally bulky and expensive, which makes them awkward to use in the reactor feed lines of small parallel reactors. Furthermore, in practice it turns out to be hard to accurately control the flow rate of small fluid flows (as are used in high throughput experimentation) using active flow controllers.

Another disadvantage of active flow controllers is that they required repeated calibration, and that during experiments, in particular during experiments that have a long running time, drift in the settings of the active flow controllers often occurs. Also, active flow controllers comprise a flow sensor and flow sensors are sensitive to drift during the course of a long experiment, more than for example pressure sensors.

WO99/64160 discloses a system and method for performing high throughput experiments. In this known system and method, a plurality of parallel flow-through reactors is applied. These reactors are fed with a reaction fluid that comes from a common fluid source. The reaction fluid coming from the common fluid source is distributed over the parallel reactors.

In the reactors, the reactions produce reactor effluent. The reactor effluent from the reactors is collected in a common exit control volume. Sequentially, samples are taken from the reactor effluent of the individual reactors for analysis so the performance of a potential catalyst can be evaluated.

The pressure in the system of WO99/64160 is controlled by controlling the pressure in the common exit control volume.

In the system and method according to WO99/64160, the flow is distributed substantially equally over the reactors. This is achieved by arranging passive flow restrictors upstream or downstream of each reactor. The passive flow restrictors all have the same resistance to fluid flow. Furthermore, the resistance to fluid flow of the passive flow restrictors is by far the highest resistance to fluid flow of all components in the system. This is done because it is not possible to have the same resistance to fluid flow in all other components of the system. For example, the pressure drop over the parallel reactors, and therewith the resistance to fluid flow of the parallel reactors, is likely to vary somewhat from one reactor to another. By giving the passive flow restrictors a resistance to fluid flow that is far higher than the resistance to fluid flow that can be expected in the reactors, the variation in resistance to fluid flow over the different reactors has little effect on the flow distribution.

However, the resistance to fluid flow of a component is directly linked to the pressure drop over the component. This means that in the system and method according to WO99/64160, a large pressure drop over the flow restrictors is required.

For example, if the pressure drop over the restrictors is 10 bar, and the variation in pressure drop over the plurality over reactors is 0.5 bar (=5% of the pressure drop over the restrictors), the deviation from the equal flow distribution will also be about 5%. If the pressure drop over the restrictors is 100 bar, and the variation in pressure drop over the plurality over reactors is 0.5 bar (=0.5% of the pressure drop over the restrictors), the deviation from the equal flow distribution will be about 0.5%. As a deviation of the equal flow distribution of less than 2%, preferably less than 0.5% is generally desired in high throughput experiments or production with microreactors, the prior art teaches the pressure drop over the restrictors should be much higher than the expected pressure drop over the other components in the system, such as the reactors, any filters if present, the tubing of the system.

However, such a high pressure drop over the restrictors can be problematic.

For example, when a certain reaction pressure is desired, the pressure in the common reaction fluid source has to be rather high. Sometimes such a high pressure in the common reaction fluid source is not available or cannot be obtained. Furthermore, in some cases it is not desirable to have a high pressure in the reaction fluid as this may invoke unwanted condensation of gaseous reaction fluid that is fed to the reactor. Furthermore, all components in the system have to be designed such that they can withstand the high pressures in the system. This makes the system complicated and expensive.

In addition, the pressure drop over any reactor could change in the course of an experiment or production run, for example due to formation of solids (e.g. carbon) and/or highly viscous liquids (e.g. heavy tars), and/or leaching of catalyst material which carbon, tar or catalyst material then accumulates for example in the reactor tube, in the frit of a fixed bed in the reactor if such a fixed bed is present, and/or in a filter in or downstream of the reactor. As sometimes the test runs may last for more than a month or even up to six months, this can be expected to occur regularly. If the pressure drop over the restrictors is to be designed as the highest pressure drop in the system, this possible rise in pressure drop over the reactors has to be taken into account as well. This increases the required pressure drop over the restrictors even more.

SUMMARY OF THE INVENTION

The invention aims to provide an alternative, preferably improved, system and method for operating parallel reactors.

The system for operating parallel reactors according to the invention comprises a plurality of reactor assemblies. Each reactor assembly comprises a flow-through reactor, a reactor feed line and a reactor effluent line.

Each flow-through reactor has an inlet and an outlet. Fluid, for example reaction fluid, enters the reactor via the reactor inlet and the reaction products leave the reactor as reactor effluent via the reactor outlet. Generally, the flow of reaction fluid into the reactor and the flow of reactor effluent from the reactor is continuously. This is contrary to a batch reactor, in which the reaction products generally mainly remain in the reactor until the reaction is finished.

The reactor optionally comprises a fixed bed that for example can support a catalyst or potential catalyst, for example a glass frit.

The reactor feed line takes fluid, for example reaction fluid, to the reactor. To that end, the reactor feed line has a first end that is in fluid communication with a primary fluid source and a second end that is connected to and in fluid communication with the reactor inlet.

The reactor effluent line takes away reactor effluent from the reactor. Each reactor effluent line has a first end, which first end is connected to the reactor outlet of the flow-through reactor.

The system according to the invention further comprises a primary fluid source. The primary fluid source can be adapted to provide a pressurized reaction fluid to the flow-through reactors of the reactor assemblies. Alternatively, the primary fluid source can be adapted to supply a different type of fluid to the flow-through reactors, such as dilution fluid or purge fluid.

The system can have a single primary fluid source that supplies fluid to all reactors in the system. A flow splitter is present between the primary fluid source and the first ends of the reactor feed lines in order to split the fluid flow over the reactor assemblies.

Alternatively, the system can have multiple fluid sources, but less than the number of reactor assemblies. In this embodiment, a group of reactor assemblies (such a group containing not all reactor assemblies of the system) shares a common primary fluid source. A flow splitter is present between the primary fluid source and the first ends of the reactor feed lines of the groups of reactor assemblies in order to split the fluid flow over the reactor assemblies of the group.

In both embodiments, the flow splitter is arranged downstream of the primary fluid source and upstream of the reactor assemblies that it provides with fluid. The flow splitter has an inlet and multiple passive flow restrictors. The inlet of the flow splitter is connected to the primary fluid source and each passive flow restrictor is in fluid communication with said inlet. Each passive flow restrictor has an outlet, which outlet is connected to the first end of the reactor feed line of its own dedicated reactor assembly. All passive flow restrictors of a flow splitter have an substantially equal resistance to fluid flow. "Substantially equal resistance to fluid flow" means that it is desirable to keep the difference in resistance to fluid flow among the passive flow restrictors to a minimum. Preferably, the variation should not be more than about 10%, more preferably not more than about 5%, most preferably less than about 1%.

"Passive" means that the flow restrictors have a fixed resistance to fluid flow (at least when process parameters like viscosity of the fluid flowing through the restrictors and/or the temperature remain constant). In a passive flow restrictor, the resistance to fluid flow is not actively modified during an experiment or operational run with the purpose of controlling the flow rate.

The passive flow restrictors can for example be capillary tubes or channels in one or more microfluidic chips.

The system according to the invention further comprises a feed line pressure measurement device. The feed line pressure measurement device is adapted to measure the pressure in the fluid flow in the reactor feed lines. The measurement of the pressure in the reactor feed lines can take place simultaneously in all reactor feed lines or sequentially. In case of sequential measurement of the pressure in the reactor feed lines, the pressure is measured in one reactor feed line after the other.

The system according to the invention further comprises an individually controllable backpressure regulator in each effluent line. Each backpressure regulator is adapted to regulate the pressure in the reactor effluent line in which it is arranged.

The system according to the invention further comprises a pressure control arrangement. The pressure control arrangement is linked to the feed line pressure measurement device and said backpressure regulators.

The pressure control arrangement comprises an input device that allows to input at least a feed line pressure setpoint into the pressure control arrangement. The feed line pressure setpoint represents a desired feed line pressure. The desired feed line pressure is the same for all reactor assemblies.

The input device may be such that an operator can enter a desired feed line pressure directly (e.g. via a keyboard). A more complex alternative would be an input system that determines a desired feed line pressure on the basis of a parameter or group of parameters that is measured or set somewhere in the system, for example using an algorithm.

The pressure control arrangement is adapted and/or programmed to individually control the backpressure regulators. For each reactor assembly the pressure measured in the reactor feed line by the feed line pressure measurement device is compared to the feed line pressure setpoint. In case of a difference between the measured feed line pressure and the feed line pressure setpoint, the corresponding backpressure regulator is adjusted make the deviating feed line pressure move towards the feed line pressure setpoint. This way, the feed line pressures of all reactor assemblies are being kept substantially the same during an experiment or a production run.

That the feed line pressures are "substantially the same" means that the variation in feed line pressures among the feed lines of the different reactor assemblies is kept to a minimum. The optimal situation is that they are all exactly the same (within the measurement accuracy that can reasonably be obtained). The less the variation in feed line pressures among the feed lines of the different reactor assemblies, the more accurate the equal flow distribution over the reactor assemblies is. In practice, a satisfactory accuracy in the flow distribution can be obtained if the variation in feed line pressures among the feed lines of the different reactor assemblies is about 5% or less. Preferably, the variation in feed line pressures among the feed lines of the different reactor assemblies is about 2% or less, more preferably about 1% or less, and most preferably about 0.5% or less. Within the meaning of this invention, when it is said that the feed line pressures are the same, it is meant that the variation in the feed line pressures among the feed lines of the different reactor assemblies is about 5% or less.

By making sure that the feed line pressures are substantially the same in all reactor assemblies, it is assured that the pressure drop between the primary fluid source and each reactor feed line is the same. These equal pressure drops ensure that the fluid coming from the primary fluid source is apportioned equally over the reactor assemblies, even if the pressure drop varies over the individual reactors (and/or other components such as filters or tubing) and/or varies over the time of an experiment or production cycle, and/or the pressure drop over the passive restrictors in the flow splitter is not several times larger than the pressure drop over the reactors.

The system and method according to the invention are suitable for use in experiments and production runs in the gas phase, gas-liquid phase ("trickle phase") and in the liquid phase.

In the system according to the invention, the pressures in the reactor effluent lines, and the pressures at the reactor outlets, will be different for the individual reactor assemblies if the pressure drop over the reactor and/or over other components such as filters (if any are present) tubing, is not the same for all reactor assemblies. This is not a problem, because each reactor assembly is equipped with its own backpressure regulator that can be controlled individually.

The advantage of using an individually controllable backpressure regulator to control the pressure in the reactor feed line is that it allows to control the pressure in the reactor feed line as well as the reactor pressure. This means that the reaction can be carried out under controllable reaction conditions.

The backpressure regulators preferably are active regulators. This means that their resistance to fluid flow can be varied during an experiment or production run. Alternatively, the backpressure regulators can have a fixed resistance to fluid flow, but also comprise a dilution line through which a dilution fluid is fed into the system. By varying the amount of diluent, the pressure can also be varied.

Optionally, the backpressure regulators are continuously adjustable, at least within a certain pressure range (as opposed to being adjustable in a stepwise manner). This allows accurate control of the feed line pressures, at least within a certain pressure range.

The system according to the invention is suitable for use at a wide range of pressures. Reactor pressures could for example be about 5 bar, about 10 bar, about 20 bar, about 40 bar, about 50 bar, about 100 bar, about 200 bar, about 300 bar.

In a possible embodiment, one or more reactor assemblies comprise a second reactor feed line, which is connected to a second reactor inlet of the reactor of said reactor assembly or to the first feed line of said reactor system.

In case multiple reactor assemblies comprise such a second reactor feed line, optionally a common second fluid source is present, and a second flow splitter. This second flow splitter distributes the fluid coming from the second fluid source over the second feed lines. For example, in such a system, one of the reactor feed lines of each reactor assembly is used to feed a liquid reaction fluid into the reactor of said reactor assembly and the other reactor feed line is used to feed a gaseous reaction fluid in to the reactor of said reactor assembly.

In a possible embodiment, the feed line pressure measurement device comprises a plurality of feed line pressure sensors. This plurality of feed line pressure sensors is arranged such that in each reactor feed line a feed line pressure sensor is provided. So, each reactor assembly has its own dedicated feed line pressure sensor. This feed line pressure sensor provides pressure measurement data on the basis of which the backpressure regulator in the same reactor assembly can be adjusted if the measured feed line pressure deviates from the feed line pressure setpoint.

In an alternative embodiment, the feed line pressure measurement device comprises a single feed line pressure sensor. This feed line pressure sensor is arranged to sequentially measure the pressure in the reactor feed lines.

This sequential measuring can for example be accomplished by providing the feed line pressure measurement device with a dead end selection valve. The dead end selection valve comprises a valve housing, a valve body inside said valve housing, multiple inlet channels and one outlet channel. The valve body connects one inlet channel with the outlet channel. The valve body is moveable inside the valve housing such that sequentially, one after the other, each inlet channel can be brought into fluid communication with the outlet channel. Each inlet channel is connected to and in fluid communication with its own dedicated reactor feed line and the outlet channel is connected to the single feed line pressure sensor.

Instead of the dead end selection valve, a setup with a measurement line and associated valve system as described in WO2012/047095 can be used, being it with a pressure sensor instead of the flow rate sensor that is used in the system and method of WO2012/047095.

The feed line pressure can be measured at any location in the reactor feed line. For example, it can be measured at or adjacent to the first end of the reactor feed line, so just downstream of a passive flow restrictor of the flow splitter. Alternatively, it can be measured at or adjacent to the second end of the reactor feed line, so at or adjacent to the reactor inlet, such that the measured feed line pressure corresponds to the reactor inlet pressure. In order to obtain accurate flow control to the reactors, it is advantageous to measure the feed line pressure at the same location in each reactor feed line.

The backpressure controller can be arranged at any location in the reactor effluent line. For example, it can be arranged at or adjacent to the first end of the reactor effluent line, so at or adjacent to the reactor outlet. In a possible embodiment of the system according to the invention, one ore more reactor assemblies are provided with a filter in the reactor effluent line. In such an embodiment, the backpressure regulator can in those reactor assemblies be arranged upstream or downstream of such a filter.

Optionally, at least one backpressure regulator comprises a flow channel for the fluid flow of which the pressure is to be controlled, which flow channel has a cross sectional area that can be controlled in size by a movable valve member in order to control the pressure of the fluid flow in the flow channel. Such a backpressure controller further comprises a valve actuator. This valve actuator is adapted to control the position of the valve member. To that end, the valve actuator in this embodiment comprises a control chamber having a fluid at a reference pressure therein. This fluid engages a pressure surface of the valve member for exerting a control force thereon. In this embodiment, the backpressure regulator further comprises a reference pressure controller. The reference pressure controller is adapted to control the reference pressure in said control chamber.

An example of such a backpressure regulator is a dome regulator. Another example of such a backpressure regulator is the one disclosed in EP1888224. However, the backpressure regulator of EP1888224 can be used in the current system and method only in the variant where there is no common control chamber for the reference fluid. A separate control chamber with an individually controllable reference pressure has to be provided for each reactor assembly. A further example of such a backpressure regulator comprises a moveable slide that varies the cross sectional area of the flow channel. The reference pressure acts on a surface of the slide in order to move it.

In embodiments wherein the backpressure controller comprises a reference pressure controller, this reference pressure controller optionally is of the design as described below.

This particular reference pressure controller comprises a first restrictor channel. This first restrictor channel has an inlet and an outlet. This particular reference pressure controller further comprises a second restrictor channel. Also the second restrictor channel has an inlet and an outlet.

This particular reference pressure controller further comprises a fluid passage. The fluid passage extends between the outlet of the first restrictor channel and the inlet of the second restrictor channel. Therewith, the fluid passage allowing fluid communication between the first restrictor channel and the second restrictor channel.

This particular reference pressure controller further comprises a pressure control fluid source. That pressure control fluid source is adapted to provide a flow of pressure control fluid through the first restrictor channel, the fluid passage and the second restrictor channel. This flow of pressure control fluid has an entrance pressure at the inlet of the first restrictor channel and an exit pressure at the outlet of the second restrictor channel. The entrance pressure is higher than said exit pressure. The flow of pressure control fluid experiences a first pressure drop $\Delta p1$ over the first restrictor channel and a second pressure drop $\Delta p2$ over the second restrictor channel.

This particular reference pressure controller further comprises a connector that connects the fluid passage to the control chamber of the valve actuator. The connector is in fluid communication with the control chamber of the backpressure regulator. The pressure control fluid at the connector has an intermediate pressure which is lower than the entrance pressure but higher than the exit pressure. This intermediate pressure is determined by the ratio between the first pressure drop $\Delta p1$ and the second pressure drop $\Delta p2$.

This particular reference pressure controller further comprises a controllable thermal device. This thermal device is adapted to heat and/or cool the first restrictor channel and/or the second restrictor channel. Therewith, it influences the ratio between the first pressure drop $\Delta p1$ and the second pressure drop $\Delta p2$. The thermal device comprises a thermal controller for controlling the thermal output of the thermal device.

The first pressure drop $\Delta p1$ and the second pressure drop $\Delta p2$ are directly linked to the resistance to fluid flow of the first restrictor channel and the second restrictor channel, respectively. The resistance to fluid flow of these restrictor channels can be influenced by changing their temperature. The change in temperature of a restrictor channel changes the temperature of the fluid flowing through that restrictor channel. This affects fluid parameters like viscosity, volume and flow rate, which in turn affect the resistance to fluid flow and thus the pressure drop.

As the intermediate pressure that occurs at the connector depends on the ratio between the first pressure drop $\Delta p1$ that occurs at the first restrictor channel and the second pressure drop $\Delta p2$ that occurs at the second restrictor channel, the intermediate pressure can be regulated by changing the temperature of the first and/or the second restrictor channel. As the intermediate pressure occurs at the connector that connects the reference pressure controller to the control chamber, the pressure in the control chamber corresponds to the intermediate pressure. So, the pressure in the control chamber can be regulated by regulating the intermediate pressure.

In a possible embodiment, the first restrictor channel and/or the second restrictor channel is a channel in a microfluidic chip. In a possible embodiment the first restrictor channel is a channel in a first microfluidic chip and the second restrictor channel is a channel in a second microfluidic chip. In an alternative embodiment, the first restrictor channel is a channel in a first microfluidic chip and the second restrictor channel is a channel in the same microfluidic chip. In that embodiment, preferably, the fluid passage between the first and the second restrictor channel is also a channel in that microfluidic chip.

Microfluidic chips are rather cheap and easy to obtain. They are also easy to handle, for example when they need to be exchanged in case the set up of the pressure controller has to be changed. Also, microfluidic chips with thermal components, e.g. heat tracing, are available. Such microfluidic chips can be used in the pressure controller according to the invention, for example by using the thermal components on the microfluidic chip as part of the thermal device of the reference pressure controller.

Alternatively, the first restrictor channel and/or the second restrictor channel is a channel in a capillary tube.

In a possible embodiment, the system further comprises a secondary fluid source and a dilution line. This is in particular useful for those embodiments in which the primary fluid source is adapted to supply a reaction fluid to the reactors. The secondary fluid source can then be adapted to provide a pressurized purge fluid or pressurized dilution fluid via said dilution line to at least one reactor assembly.

The dilution line can be arranged to feed pressurized purge fluid or pressurized dilution fluid into a reactor effluent line. Alternatively, in embodiments wherein at least one flow-through reactor comprises a fixed bed, the dilution line is arranged to feed pressurized purge fluid or pressurized dilution fluid into that reactor downstream of the fixed bed and upstream of the reactor outlet of that reactor.

The invention further relates to a method for operating parallel reactors. This method comprises the step of providing a plurality of reactor assemblies, each reactor assembly comprising: a flow-through reactor, which flow-through reactor comprises a reactor inlet and a reactor outlet, and a reactor feed line, which reactor feed line has a first end and a second end, said second end being connected to the reactor inlet of the flow-through reactor, said reactor feed line being adapted to supply a fluid to the flow-through reactor, and a reactor effluent line, which reactor effluent line has a first end, which first end is connected to the reactor outlet of the flow-through reactor, said reactor effluent line being adapted to discharge reactor effluent from the reactor.

The method according to the invention further comprises the step of providing a primary fluid source, which primary fluid source is adapted to provide a pressurized fluid to the flow-through reactors.

The method according to the invention further comprises the step of providing a flow splitter which is arranged downstream of the primary fluid source and upstream of the reactor assemblies. This flow splitter has an inlet and multiple passive flow restrictors. The inlet of the flow splitter is connected to the primary fluid source and each passive flow restrictor is in fluid communication with this inlet. Each passive flow restrictor has an outlet, which outlet is connected to the first end of the reactor feed line of its own dedicated reactor assembly. All passive flow restrictors have a substantially equal resistance to fluid flow.

The method according to the invention further comprises the step of providing a pressure difference between the primary fluid source and the effluent lines, such that the fluid flows from the primary fluid source via the flow splitter, the reactor feed lines and the reactors to the effluent lines.

The method according to the invention further comprises the step of setting a feed line pressure setpoint, said feed line pressure setpoint representing a desired feed line pressure. The desired feed line pressure is the same for all reactor assemblies, The method according to the invention further comprises the step of measuring the pressure of the fluid flow in each reactor feed line.

The method according to the invention further comprises the step of comparing each measured feed line pressure with the feed line pressure setpoint. In case of a difference between the measured feed line pressure in a reactor assembly and the feed line pressure setpoint, the pressure in the reactor effluent line of said reactor assembly is adjusted in such a way that that the measured feed line pressure becomes substantially the same as the feed line pressure setpoint.

This method can be used for performing high throughput experiments, for example screening of potential catalysts. Alternatively, the method can be used for production of compounds using microreactors.

The invention will be described in more detail below under reference to the drawing, in which in a non-limiting manner exemplary embodiments of the invention will be shown.

DETAILED DESCRIPTION OF THE INVENTION

Figure 1:
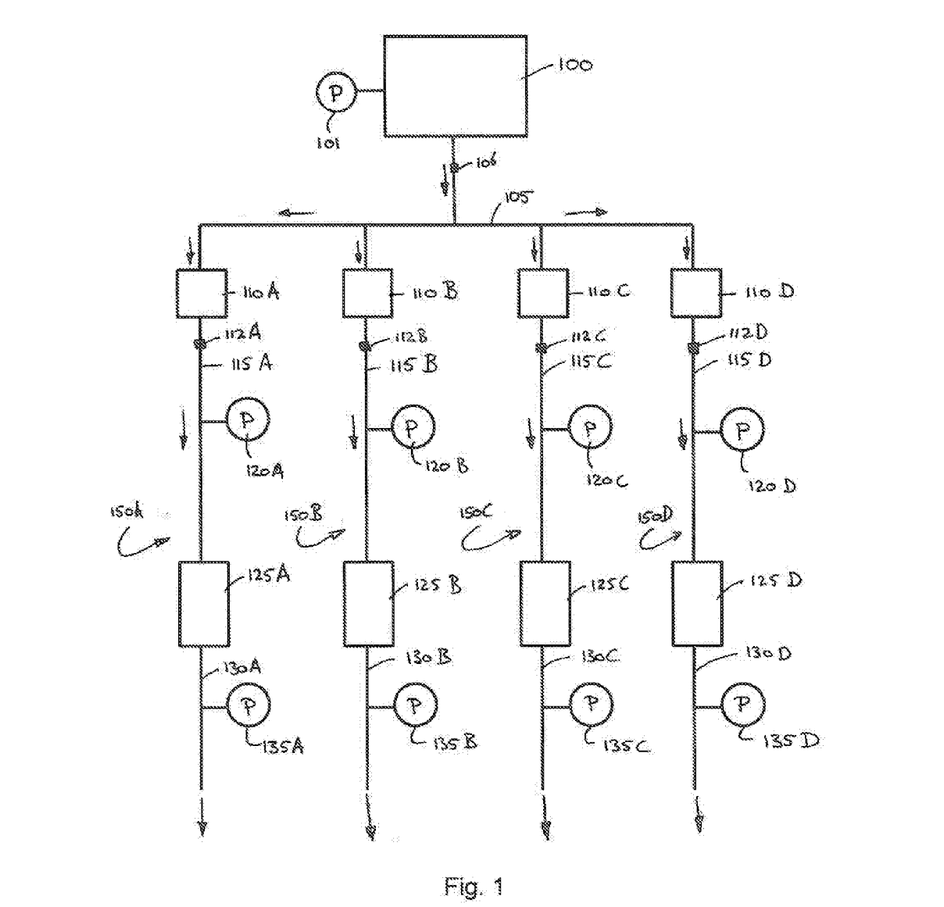
FIG. 1: a general set-up of a system with parallel reactors.

FIG. 1 shows a general set-up of a system with parallel reactors, which for example can be used for performing high throughput experiments or as microreactors for the production of chemical compounds.

In the system of FIG. 1, a fluid source 100 is present, which is connected to a flow splitter 105. The flow splitter 105 comprises one inlet 106 and multiple outlets 112A, 112B, 112C, 112D. Each outlet 112A, 112B, 112C, 112D of the flow splitter 105 is connected to an associated reactor assembly 150A, 150B, 150C, 150D.

Just upstream of each flow splitter outlet 112A, 112B, 112C, 112D, a passive flow restrictor 110A, 110B, 110C, 110D is present.

Each reactor assembly 150A, 150B, 150C, 150D comprises a reactor feed line 115A, 115B, 115C, 115D, a flow-through reactor 125A, 125B, 125C, 125D and a reactor effluent line 130A, 130B, 130C, 130D.

The elements of the system of FIG. 1 are in fluid communication with each other in such a way that the reactors 125A, 125B, 125C, 125D receive pressurized fluid (either gas, liquid or a combination of gas and liquid) from fluid source 100. Each reactor 125A, 125B, 125C, 125D discharges its effluent via the associated reactor effluent line 130A, 130B, 130C, 130D.

At some point in time during operation, the pressure in the fluid source, for example measured by pressure gauge 101, is p1. This pressure p1 generally is well above atmospheric pressure.

At this same point in time during operation, the pressure in reactor feed line 115A, for example measured by pressure gauge 120A, is p2A. At this same point in time during operation, the pressure in reactor feed line 115B, for example measured by pressure gauge 120B, is p2B. At this same point in time during operation, the pressure in reactor feed line 115C, for example measured by pressure gauge 120C, is p2C. At this same point in time during operation, the pressure in reactor feed line 115D, for example measured by pressure gauge 120D, is p2D. The reactor feed line pressures p2A, p2B, p2C, p2D can for example be measured close to the flow splitter outlets 112A, 112B, 112C, 112D or close to the inlets of the reactors 125A, 125B, 125C, 125D. In case the reactor feed line pressures p2A, p2B, p2C, p2D are measured close to the inlets of the reactors 125A, 125B, 125C, 125D, the measured pressures p2A, p2B, p2C, p2D are the same or substantially the same as the reactor inlet pressures.

If the resistance to fluid flow in the flow path between the fluid source 100 and the pressure gauge 120A is different from the resistance to fluid flow in the flow path between for example the fluid source 100 and the pressure gauge 120B, p2A is different from p2B.

At this same point in time during operation, the pressure in reactor effluent line 130A, for example measured by pressure gauge 135A, is p3A. At this same point in time during operation, the pressure in reactor effluent line 130B, for example measured by pressure gauge 135B, is p3B. At this same point in time during operation, the pressure in reactor effluent line 130C, for example measured by pressure gauge 135C, is p3C. At this same point in time during operation, the pressure in reactor effluent line 130D, for example measured by pressure gauge 135D, is p3D.

The reactor effluent line pressures p3A, p3B, p3C, p3D can for example be measured close to the outlet of the reactors 125A, 125B, 125C, 125D. In case the reactor feed line pressures p3A, p3B, p3C, p3D are measured close to the outlets of the reactors 125A, 125B, 125C, 125D, the measured pressures p3A, p3B, p3C, p3D are the same or substantially the same as the reactor outlet pressures.

If the resistance to fluid flow in the flow path between the fluid source 100 and the pressure gauge 135A is different from the resistance to fluid flow in the flow path between for example the fluid source 100 and the pressure gauge 135B, p3A is different from p3B.

When in systems of the type shown in FIG. 1 the pressure is controlled—for example to control the distribution of fluid flow over the individual reactors 125A, 125B, 125C, 125D—, is is known to use a he pressure control system that is adapted to keep the pressures p3A, p3B, p3C and p3D (so: the pressures just downstream of the reactors 125A, 125B, 125C, 125D) the same. This can for example be done by using pressure controllers that are arranged just downstream of the reactor and all have the same set point for the desired pressure, or by collecting the reactor effluent flows in a single common exit control volume (as e.g. is disclosed in WO99/64160).

However, according to the invention, it is not these pressures p3A, p3B, p3C and p3D that should be kept the same by the pressure control system, but the pressures p2A, p2B, p2C and p2D (so: the pressures in the reactor feed lines, upstream of the reactors 125A, 125B, 125C, 125D).

Experiments have been conducted to demonstrate the effects obtained by the invention. In the experiments, the system of FIG. 1 was used. The reactors 125A and 125D were provided with inert particles with a size of about 1 μm. This caused a pressure drop over the reactors 125A and 125D. The reactors 125B and 125C were empty during the experiments.

The pressure gauges 120A, 120B, 120C, 120D were arranged to measure the reactor inlet pressures of the reactors 125A, 125B, 125C, 125D. The pressure gauges 135A 135B, 135C, 135D were arranged to measure the reactor outlet pressures of the reactors 125A, 125B, 125C, 125D.

A total H2-gas flow of 36.8 Nml/min was fed into the system by fluid source 100. The fluid flow was kept constant over the course of the experiment. The aim was to distribute the flow equally over the four reactors 125A, 125B, 125C, 125D, so about 9.2 Nml/min for each reactor. A flow splitter 105 comprising was passive flow restrictors 110A, 110B, 110C, 110D was used to divide the fluid flow over the four reactors 125A, 125B, 125C, 125D.

In one experiment, the conventional way of reactor flow control was applied. In this experiment, the pressure control system was adapted to keep the pressure reactor outlet pressures (so: just downstream of the reactors; say p3A, p3B, p3C, p3D), equal. In this experiment, the reactor outlet pressures were set at 8 barg.

In the experiment, several parameters were measured. The measurement results are shown in table 1. The "Pressure drop over restrictor" as is mentioned in table 1 relates to the pressure drop over the restrictors 110A, 110B, 110C, 110D respectively.

TABLE 1 flow control by controlling pressure downstream of reactors

| Reactor no. | Reactor Inlet Pressure (barg) | Reactor Outlet Pressure (barg) | Restrictor Inlet pressure (barg) | Pressure drop over restrictor (barg) | Pressure drop over reactor (barg) | Flow through reactor (Nml/min) |
|---|---|---|---|---|---|---|
| 125A | 8.44 | 8 | 27.62 | 19.12 | 0.44 | 9.08 |
| 125B | 8.02 | 8 | 27.62 | 19.54 | 0.02 | 9.35 |
| 125C | 7.99 | 8 | 27.62 | 19.57 | −0.01 | 9.35 |
| 125D | 8.66 | 8 | 27.62 | 18.90 | 0.66 | 9.02 |

As is clear from the measurement results in table 1, in the experiment in which the pressure control system is adapted to keep the reactor outlet pressures the same, the flow rate through the reactors varied between 9.02 Nml/min and 9.35 Nml/min, which is a variation of about 3.5%.

In a second experiment, the reactor flow control according to the invention was applied. In this experiment, the pressure control system was adapted to keep the pressure reactor inlet pressures (so: just upstream of the reactors; say p2A, p2B, p2C, p2D), equal. In this experiment, the reactor inlet pressures were set at 8 barg.

In the experiment, several parameters were measured. The measurement results are shown in table 2. The "Pressure drop over restrictor" as is mentioned in table 2 relates to the pressure drop over the restrictors 110A, 110B, 110C, 110D respectively.

TABLE 2 flow control by controlling pressure upstream of reactors

| Reactor no. | Reactor Inlet Pressure (barg) | Reactor Outlet Pressure (barg) | Restrictor Inlet pressure (barg) | Pressure drop over restrictor (barg) | Pressure drop over reactor (barg) | Flow through reactor (Nml/min) |
|---|---|---|---|---|---|---|
| 125A | 8 | 7.52 | 27.56 | 19.56 | 0.48 | 9.16 |
| 125B | 8 | 8 | 27.56 | 19.56 | 0 | 9.20 |
| 125C | 8 | 8.2 | 27.56 | 19.56 | −0.2 | 9.18 |
| 125D | 8 | 7.28 | 27.56 | 19.56 | 0.72 | 9.20 |

As is clear from the measurement results in table 2, in the experiment in which the pressure control system is adapted to keep the reactor inlet pressures the same, the flow rate through the reactors varied between 9.16 Nml/min and 9.20 Nml/min, which is a variation of about 0.4%. This is considerably less than when the known method of reactor outlet pressure control is applied.

Figure 2:
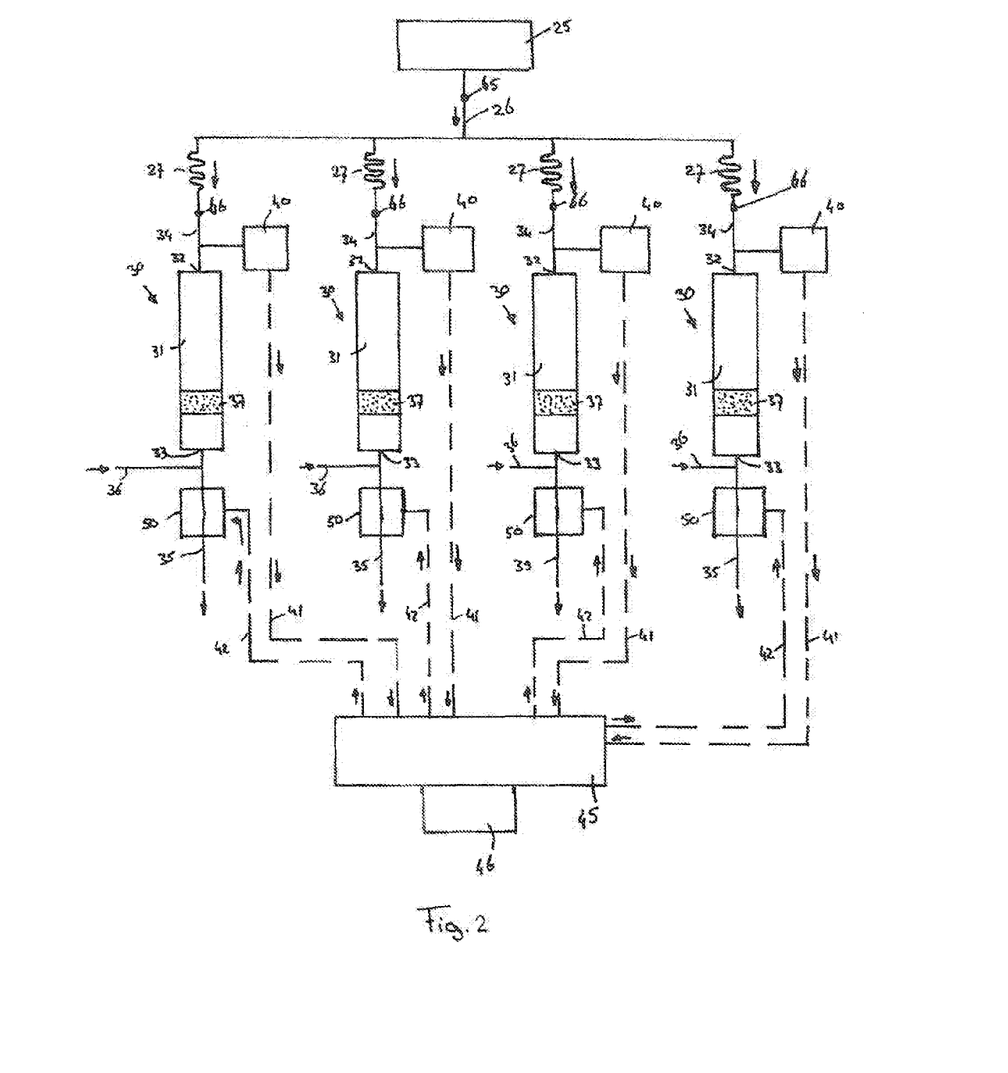
FIG. 2: a first embodiment of a system according to the invention.

FIG. 2 shows a first embodiment of a system according to the invention.

The system comprises a plurality of reactor assemblies 30. In FIG. 2, four reactor assemblies 30 are shown, but any number higher than one is possible. Each reactor assembly 30 comprises a flow-through reactor 31 with a reactor inlet 32 and a reactor outlet 33. A reactor feed line 34 extends between a primary fluid source 25 and the reactor inlet 32. The primary fluid source 25 provides a pressurized reaction fluid to the reactors 31, via the reactor feed lines 34. The reactor 31 optionally contains a fixed bed 37.

The reactor assembly 30 further comprises a reactor effluent line 35. The reactor effluent line 35 is connected to the reactor outlet 33. Reaction products that are formed in the reactor leave the reactor as reactor effluent via the reactor outlet 33 and are discharged further via the reactor effluent line 35.

The system shown in FIG. 2 comprises a flow splitter 26 for dividing the fluid flow from the primary fluid source over the reactor assemblies 30. The flow splitter 26 has an inlet 65 and multiple passive flow restrictors 27. The inlet 65 of the flow splitter 26 is connected to the primary fluid source 25. Each passive flow restrictor 27 is in fluid communication with the inlet 65. The flow restrictors 27 are passive flow restrictors, which means that they have a fixed resistance to fluid flow. Each passive flow restrictor 27 has an outlet 66, which outlet 66 is connected to the first end of the reactor feed line 34 of its own dedicated reactor assembly 30. All passive flow restrictors 27 have a substantially equal resistance to fluid flow The system shown in FIG. 2 further comprises a feed line pressure measurement device. This feed line pressure measurement device is adapted to measure the pressure in the fluid flow in the reactor feed lines 34.

In the system of FIG. 2, the feed line pressure measurement device comprises a plurality of feed line pressure sensors 40. The feed line pressure sensors 40 are arranged such that in each reactor feed line 34 a feed line pressure sensor 40 is provided.

In the system of FIG. 2, in each effluent line an individually controllable backpressure regulator 50 is provided, said backpressure regulator 50 being adapted to regulate the pressure in each reactor effluent line 35 individually.

Furthermore, in the system of FIG. 2, a pressure control arrangement 45 is provided. The pressure control arrangement 45 is linked to the feed line pressure measurement device and to the backpressure regulators 50. More in particular, the pressure control arrangement 45 is linked to the feed line pressure measurement sensors 40 and to the backpressure regulators 50. The pressure sensors 40 provide a measurement data signal to the pressure control arrangement 45 via links 41. The backpressure controllers receive a control signal from the pressure control arrangement 45 via links 42.

The pressure control arrangement 45 comprises an input device 46. The input device 46 allows to input at least a feed line pressure setpoint into the pressure control arrangement 45. This feed line pressure setpoint represents a desired feed line pressure. The desired feed line pressure is the same for all reactor assemblies 30.

The pressure control arrangement 45 is adapted and/or programmed to individually control the backpressure regulators 50 such that for each reactor assembly 30 the pressure measured in the reactor feed line 34 by the feed line pressure measurement device is compared to said feed line pressure setpoint. In case of a difference between the measured feed line pressure and the feed line pressure setpoint, the corresponding backpressure regulator 50 is adjusted such that the feed line pressures are substantially the same in all reactor assemblies 30.

When the feed line pressures as measured by the pressure sensors 40 are all the same, the pressure drop between the primary fluid source 25 and the outlet 66 of each flow restrictor of the flow splitter 26 is the same. When the pressure drop between the primary fluid source 25 and the outlet 66 of each flow restrictor of the flow splitter 26 is the same, the flow rates in the reactor feed lines 34 of all reactor assemblies 30 are the same. Therewith, the fluid coming from the primary fluid source 25 is apportioned equally over the reactor assemblies 30, and therewith over the flow-through reactors 31.

This is the desired situation in the system according to the invention. If somehow the feed line pressure in one or more of the reactor feed lines 34 deviates from the desired feed line pressure, the pressure control arrangement 45 will act by adjusting the setting of the backpressure controller or backpressure controllers 50 in the reactor assembly or reactor assemblies 30 in which the deviating feed line pressure occurs such that the feed line pressure in that reactor assembly becomes (substantially or exactly) the same again as the feed line pressure setpoint. Therewith, the feed line pressure also becomes (substantially or exactly) the same as the feed line pressure in the other reactor assemblies.

Such a deviation in desired feed line pressure can for example occur when a different pressure drop occurs over one or more of the reactors 31. This can occur right from the start of the reaction, but it can also happen over time, during an experiment or production run. This can for example be caused by a filter or fixed bed slowly becoming a bit clogged up. The system according to the invention prevents that such a situation would influence the flow rates of the fluid to the reactors 31 and/or the apportionment of the fluid over the reactors 31.

In a situation when the pressure drop over one or more reactors 31 is different from the pressure drop over other reactors 31, in the system according to the invention the backpressure regulators 50 associated with those reactors 31 that have a different pressure drop will have a different setting from the backpressure regulators 50 that associated with the other reactors 31. For example, assume that the pressure at the primary fluid source is 15 bar, and the desired feed line pressure is 10 bar. The feed line pressure setpoint as entered into the pressure control arrangement 45 will be then be 10 bar.

Assume that in that situation, for example, the pressure drop over all four reactors is 0.5 bar over each of the reactors 31 at the start of the experiment or production run. The backpressure regulators will then all be adjusted at 9.5 bar.

Assume now that during the experiment or production run, the fixed bed 37, of example a glass frit, of one reactor 31 will start to clog up somewhat. As a consequence of that, the pressure drop over that reactor will for example increase from 0.5 bar to 0.8 bar. Initially, this will lead to a deviation in the feed line pressure in the feed line 34 connected to this particular reactor, for example from 10 bar to 10.3 bar. As a consequence, this particular reactor will receive less fluid form the primary fluid source than the other reactors, therewith disturbing the equal distribution of the fluid flow from the primary fluid source 25.

The pressure sensor 40 that measures the feed line pressure in this particular feed line 34 will measure this deviating feed line pressure. Via link 41, the information about the deviating feed line pressure will reach the pressure control arrangement 45. The pressure control arrangement 45 will detect the deviation from the desired feed line pressure and will take action: it will adjust the setting of the backpressure controller 50 that is associated with the reactor 31 with the different pressure drop to 9.2 bar. As a consequence, the feed line pressure will return to 10 bar for that particular reactor assembly, and the fluid flow from the primary fluid source is again apportioned equally over all reactors 31.

Optionally, a diluent line 36 is provided in the system according to FIG. 2. This diluent line 36 can be used to add a diluent to the reactor effluent. It can alternatively be used for purging. In the embodiment of FIG. 2, the diluent line 36 is connected to the reactor effluent line 35 downstream of the reactor outlet 33 and upstream of the backpressure regulator 50. However, alternative arrangements are possible, for example, in which the diluent line 36 is connected to the reactor effluent line 35 downstream of the backpressure regulator 50 or in which the diluent line 36 is connected to the reactor 31, adjacent to the reactor outlet 33 or at least between the fixed bed 37 (if present) and the reactor outlet 33.

Figure 3:
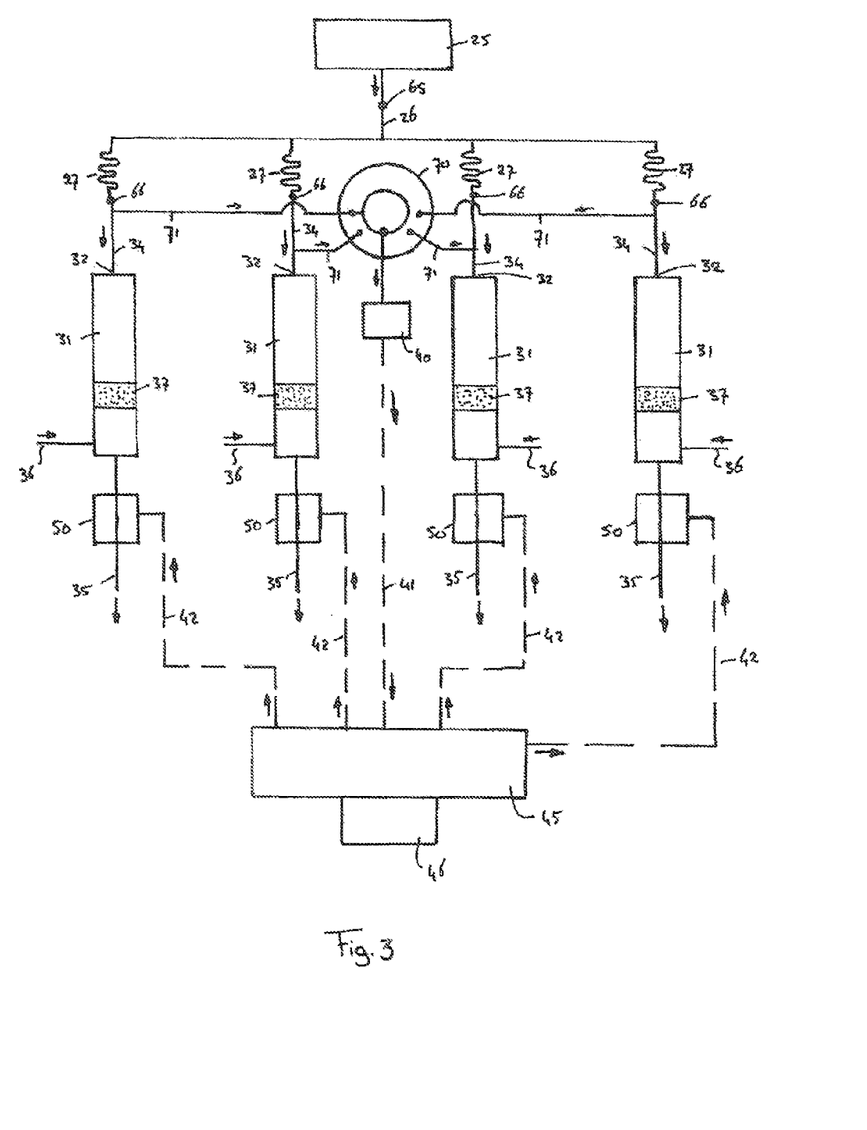
FIG. 3: a second embodiment of a system according to the invention.

FIG. 3 shows a second embodiment of a system according to the invention. This embodiment is different from the embodiment of FIG. 2 with respect to the feed line pressure measurement device. In the other components and in its functioning, the embodiment of FIG. 3 is the same as the embodiment of FIG. 2.

In the embodiment of FIG. 3, the feed line pressure measurement device comprises a single feed line pressure sensor 40, instead of multiple feed line pressure sensors as shown in FIG. 2. Furthermore, in the embodiment of FIG. 3, each reactor feed line 34 is provided with a branch line 71. Each branch line 71 has a first end that is connected to its associated feed line 34, and a second end, that is connected to an inlet of dead end selection valve 70.

The dead end selection valve has multiple inlets and one outlet. The outlet is connected to the single feed line pressure sensor 40.

The dead end selection valve 70 further comprises a valve housing and a valve body inside said valve housing. The valve body allows to connect one inlet channel with the outlet channel. The other inlet channels are dead ends. The valve body is moveable inside the valve housing such that sequentially, one after the other, each inlet channel can be brought into fluid communication with the outlet channel. There is never more than one inlet channel in fluid communication with the outlet channel of the dead end selection valve 70. This way, sequentially, each inlet channel can be brought into fluid communication with the outlet channel.

The reactor feed lines 34 are connected to the inlet channels of the dead end selection valve 70 via the branch lines 71. The feed line pressure sensor 40 is connected to the outlet channel of the dead end selection valve 70. With this arrangement, the feed line pressure sensor 40 can measure the pressure in one reactor feed line 34 after the other, so in a sequential way.

In particular in situations where pressure changes are rather gradual this setup of the feed line pressure measurement device offers a good alternative for the feed line pressure measurement device as shown in FIG. 2.

Optionally, a diluent line 36 is provided in the system according to FIG. 3. This diluent line 36 can be used to add a diluent to the reactor effluent. It can alternatively be used for purging. In the embodiment of FIG. 3, the diluent line 36 is connected to the reactor 31, adjacent to the reactor outlet 33 or at least between the optional fixed bed 37 and the reactor outlet 33.

However, alternative arrangements are possible, for example, in which the diluent line 36 is connected to the reactor effluent line 35 downstream of the backpressure regulator 50 or in which the diluent line 36 is connected to the reactor effluent line 35 downstream of the reactor outlet 33 and upstream of the backpressure regulator 50.

Figure 4:
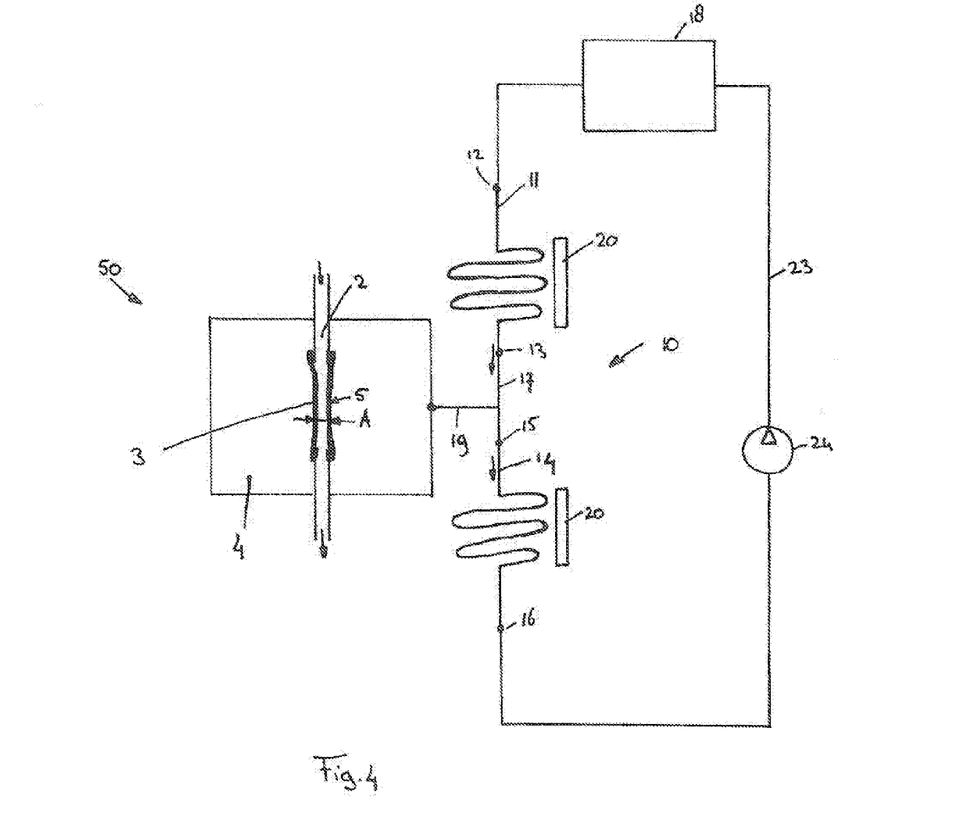
FIG. 4: a possible embodiment of a backpressure regulator that can be used in the system and method according to the invention.

FIG. 4 shows a possible embodiment of a backpressure regulator 50 that can be used in the system and method according to the invention.

The backpressure regulator 50 of FIG. 4 comprises a flow channel 2. The fluid flow of which the pressure is to be controlled passes through this flow channel 2 as indicated by the arrows in FIG. 4. The flow channel 2 has a cross sectional area indicated by arrows A in FIG. 4. Flow channel 2 can be connected to or arranged in a reactor effluent line 35 of a reactor assembly 30 of the system according to the invention.

The backpressure regulator 50 of FIG. 4 further comprises a movable valve member 3. The moveable valve member 3 is adapted to control the size of the cross sectional area of the flow channel 2. This has the effect that the pressure of the fluid flow in the flow channel 2 is controlled. In the embodiment of FIG. 4, the moveable member 3 is a membrane that forms part of the wall of the flow channel 2. In this case, the membrane is in the form of a tube.

The backpressure regulator 50 of FIG. 4 further comprises a valve actuator. The valve actuator is adapted to control the position of the valve member 3. The valve actuator comprises a control chamber 4. In this control chamber 4, a fluid under a reference pressure is present. This fluid engages a pressure surface 5 of the valve member 3 for exerting a control force thereon in order to influence the cross sectional area of the flow channel 2. In the embodiment of FIG. 4, the pressure surface 5 is the outside of the wall of the tube-shaped membrane. The fluid in the control chamber 4 can for example squeeze the tube-shaped membrane to reduce the cross sectional area of the flow channel 2, making the pressure in the flow channel 2 increase.

The backpressure regulator 50 of FIG. 4 further comprises a reference pressure controller 10. This reference pressure controller is adapted to control the reference pressure in the control chamber 4.

There are many alternatives for the reference pressure controller. If space allows, a conventional pressure controller may be used as a reference pressure controller. However, in the backpressure controller of FIG. 4, a special kind of reference pressure controller is used. This reference pressure controller is in particular suitable for use in high throughput experimentation and production of compounds using parallel microreactors, as it allows accurate and fast control of the reference pressure, and therewith of the feed line pressure, and it requires only little space.

This reference pressure controller 10 as shown in FIG. 4 comprises a first restrictor channel 11. The first restrictor channel 11 has an inlet 12 and an outlet 13. The reference pressure controller 10 further comprises a second restrictor channel 14. The second restrictor channel 14 has an inlet 15 and an outlet 16.

Furthermore, a fluid passage 17 is provided. This fluid passage 17 extends between the outlet 13 of the first restrictor channel 11 and the inlet 15 of the second restrictor channel 14. The fluid passage 17 allows fluid communication between the first restrictor channel 11 and the second restrictor channel 14. Depending on the specific embodiment, the fluid passage 17 can be very short (for example if only little space is available) or rather long (for example to allow the pressure fluid to change temperature back to the initial temperature after being heated or cooled in the first restrictor channel).

A pressure control fluid source (not shown in FIG. 2) is provided for providing a flow of a pressure control fluid through the first restrictor channel 11, the fluid passage 17 and the second restrictor channel 14, as indicated by the arrows in FIG. 2. The pressure control fluid can be a gas or a liquid. For example, nitrogen gas is a suitable pressure control fluid.

The flow of pressure control fluid has an entrance pressure at the inlet 12 of the first restrictor channel 11 and an exit pressure at the outlet 16 of the second restrictor channel 14. As there is a flow of pressure control fluid from the inlet 12 of the first restrictor channel 11 to the outlet 16 of the second restrictor channel 14, the entrance pressure is higher than the exit pressure.

The flow of pressure control fluid experiences a first pressure drop $\Delta p1$ over the first restrictor channel 11 and a second pressure drop $\Delta p2$ over the second restrictor channel 14.

The reference pressure controller 10 further comprises a connector 19 that connects the fluid passage 17 to the control chamber 4 of the valve actuator. The connector 19 is in fluid communication with the control chamber 4. The connector 19 can for example comprise a channel and/or a connection element such as a snap-fit connection element or a threaded connection element. The connector 19 could be welded or soldered to control chamber 4. The connector 19 can be permanently fixed to the control chamber 4 or it can be mounted in a detachable way.

The pressure control fluid has an intermediate pressure at the connector 17 which is lower than the entrance pressure but higher than the exit pressure. The value of the intermediate pressure is determined by the ratio between the first pressure drop $\Delta p1$ and the second pressure drop $\Delta p2$. For example, the resistance to fluid flow of the first restrictor channel 11 is the same as the resistance to fluid flow of the second restrictor channel 14, the entrance pressure at the inlet 12 of the first restrictor channel 11 is 150 bar and the exit pressure at the outlet 16 of the second restrictor channel 15 is 100 bar, the intermediate pressure will be 125 bar.

The intermediate pressure corresponds to the pressure in the control chamber 4.

The reference pressure controller 10 further comprises a controllable thermal device 20. Thermal device 20 is shown only schematically in FIG. 4. The thermal device 20 can be realized in many different ways: comprising a Peltier element, comprising electric heat tracing, comprising a pair of electrodes with a voltage thereon, comprising a system for circulating a thermal fluid for heating and/or cooling, comprising a housing for accommodating the first or second restrictor channel, the temperature of the interior of the housing being controllable.

The thermal device 20 is adapted to heat and/or cool the first restrictor channel 11 and/or the second restrictor channel 14. The thermal device can arranged and adapted to just heat and/or cool the first restrictor channel 11. Alternatively, the thermal device may be arranged and adapted to heat and/or cool just the second restrictor channel 14. Alternatively, the thermal device 20 may be arranged and adapted to heat and/or cool both the first restrictor channel 11 and the second restrictor channel 14.

Changing the temperature of a restrictor channel 11, 14 makes that the temperature of the pressure control fluid in that restrictor 11,14 also changes. This results in a change in pressure drop over the restrictor channel 11,14 of which the temperature has been changed.

Therewith, the thermal device 20 can be used to influence the ratio between the first pressure drop $\Delta p1$ and the second pressure drop $\Delta p2$, and therewith to change the intermediate pressure and the pressure in the pressure control chamber 4.

For example, initially the resistance to fluid flow of the first restrictor channel 11 is the same as the resistance to fluid flow of the second restrictor channel 14, the entrance pressure at the inlet 12 of the first restrictor channel 11 is 150 bar and the exit pressure at the outlet 16 of the second restrictor channel 15 is 100 bar, the intermediate pressure will be 125 bar.

For example, nitrogen gas is used as a pressure control fluid. And for example, the thermal device 20 is used to heat the first restrictor channel 11. No heating or cooling is applied to the second flow restrictor channel 14. Due to the heating of the first restrictor channel 11, the first pressure drop $\Delta p1$ that occurs over the first restrictor channel 11 increases, while the second pressure drop $\Delta p2$ over the second restrictor channel 14 does not change or at least does not change substantially. In general, the volume of fluid passing through the restrictor channels is so small that the pressure control fluid has cooled again when it passes through the second restrictor channel 14, so the resistance to fluid flow of the second restrictor channel 14 remains the same.

If not the first restrictor channel 11 but (only) the second restrictor channel 14 is heated and/or cooled is by the thermal device 20, only the second pressure drop $\Delta p2$ will change, and not the first pressure drop $\Delta p1$ over the first restrictor channel 11.

The increase in the first pressure drop $\Delta p1$ while the second pressure drop remains substantially the same results in a decrease of the intermediate pressure because the ratio between the first pressure drop $\Delta p1$ and the second pressure drop $\Delta p2$ has changed. Therewith, the corresponding pressure in the control chamber 4 has also decreased, for example to 122 bar.

With the reference pressure controller as used in the backpressure regulator 50 according to the FIG. 4, it is possible to continuously vary the reference pressure over a certain pressure range.

The thermal device 20 comprises a thermal controller for controlling the thermal output of the thermal device 20, so the reference pressure can be controlled actively.

The reference pressure controller as shown in FIG. 4 comprises a pressure control fluid reservoir 18. The pressure control fluid reservoir 18 is arranged upstream of and in fluid communication with the inlet 12 of the first restrictor channel 11.

The pressure control fluid reservoir 18 is adapted to contain pressurized pressure control fluid. The pressure in the pressure control fluid reservoir 18 is (somewhat) higher than the entrance pressure at the inlet 12 of the first restrictor channel 11, so that a flow of pressure control fluid is established from the pressure control fluid reservoir 18, via the first restrictor channel 11, the fluid passage 13 and the second restrictor channel 14 to the outlet 16 of the second restrictor channel 14. From there, the pressure control fluid may flow to a collection reservoir or it can be transferred to waste (not shown). Or it can be transferred back to the pressure control fluid reservoir, for example by a return line 23 and a pump 24, as is shown in FIG. 4.

The reference pressure controller as shown in FIG. 4 comprises a return line 23 that extends from the outlet 16 of the second restrictor channel 14 to the inlet 12 of the first restrictor channel 11. Furthermore, a pump 24 is present to provide circulation of the pressure control fluid through the first restrictor 11, the fluid passage 17, the second restrictor 14 and the return line 23. The presence of the pressure control fluid reservoir 18 helps to level out any pressure waves in the system that may occur due to the action of the pump 24. In an alternative embodiment (not shown) a pressure control fluid reservoir 18 may be present between the outlet 16 of the second restrictor channel 14 and the pump 24, as an alternative or in addition to the pressure reservoir as shown in FIG. 4.

The pressure control fluid reservoir 18, the return line 23 and the pump 24 are optional features. It is possible that the reference pressure controller 10 does not comprise any of these three features, and that the flow of pressure control fluid through the first restrictor channel 11 and the second restrictor channel 14 is realized in a different manner.

Alternatively, it is possible that the reference pressure controller 10 comprises pressure control fluid reservoir 18, but not the return line 23 and the pump 24. The pressure control fluid then flows from the pressure control fluid reservoir 18 via the first and second restrictor channel 11,14 for example to a collection reservoir or it can be transferred to waste.

In another alternative embodiment, just the return lie 23 and the pump 24 are present, and not the pressure control fluid reservoir 18.

The invention claimed is:

1. A system for operating parallel reactors, which system comprises:
a plurality of reactor assemblies, each reactor assembly comprising:
a flow-through reactor, said flow-through reactor comprising a reactor inlet and a reactor outlet,
a reactor feed line, which reactor feed line has a first end and a second end, said second end being connected to the reactor inlet of the flow-through reactor, said reactor feed line being adapted to supply a fluid to the flow-through reactor,
a reactor effluent line, which reactor effluent line has a first end, which first end is connected to the reactor outlet of the flow-through reactor, said reactor effluent line being adapted to discharge reactor effluent from the reactor,
a primary fluid source, which primary fluid source is adapted to provide a pressurized fluid to the flow-through reactors,
a flow splitter which is arranged downstream of the primary fluid source and upstream of the reactor assemblies, said flow splitter having an inlet and multiple passive flow restrictors, wherein the inlet of the flow splitter is connected to the primary fluid source and each passive flow restrictor is in fluid communication with said inlet, and wherein each passive flow restrictor has an outlet, which outlet is connected to the first end of the reactor feed line of its own dedicated reactor assembly, and wherein all passive flow restrictors have an substantially equal resistance to fluid flow,
wherein the system further comprises a feed line pressure measurement device, said feed line pressure measurement device being adapted to measure the pressure in the fluid flow in the reactor feed lines,
wherein in each reactor effluent line an individually controllable backpressure regulator is provided, said backpressure regulator being adapted to regulate the pressure in each reactor effluent line individually,
wherein further a pressure control arrangement is provided, said pressure control arrangement being linked to said feed line pressure measurement device and said backpressure regulators, said pressure control arrangement comprising an input device allowing to input at least a feed line pressure setpoint into the pressure control arrangement, said feed line pressure setpoint representing a desired feed line pressure, said desired feed line pressure being the same for all reactor assemblies,
wherein said pressure control arrangement is adapted and/or programmed to individually control the backpressure regulators such that for each reactor assembly the pressure measured in the reactor feed line by the feed line pressure measurement device is compared to said feed line pressure setpoint and in case of a difference between the measured feed line pressure and the feed line pressure setpoint, the corresponding backpressure regulator being adjusted such that the measured feed line pressure becomes substantially the same as the feed line pressure setpoint, and therewith substantially the same as the feed line pressures in the other reactor assemblies; and
wherein the system further comprises a secondary fluid source and a dilution line, said secondary fluid source being adapted to provide a pressurized purge fluid or pressurized dilution fluid via said dilution line to at least one reactor assembly.

2. The system according to claim 1,
wherein the feed line pressure measurement device comprises a plurality of feed line pressure sensors, said plurality of feed line pressure sensors being arranged such that in each reactor feed line a feed line pressure sensor is provided.

3. The system according to claim 1,
wherein the feed line pressure measurement device comprises a single feed line pressure sensor, said single feed line pressure sensor being arranged to sequentially measure the pressure in the reactor feed lines.

4. The system according to claim 3,
wherein the feed line pressure measurement device further comprises a dead end selection valve, said dead end selection valve comprising a valve housing, a valve body inside said valve housing, multiple inlet channels and one outlet channel, the valve body connecting one inlet channel with the outlet channel, the valve body being moveable inside the valve housing such that sequentially, each inlet channel can be brought into fluid communication with the outlet channel,
wherein each inlet channel is connected to and in fluid communication with its own dedicated reactor feed line and wherein the outlet channel is connected to the single feed line pressure sensor.

5. The system according to claim 1,
wherein the backpressure regulators are continuously adjustable.

6. The system according to claim 1,
wherein the feed line pressure is measured at or adjacent to the reactor inlet, such that the measured feed line pressure corresponds to the reactor inlet pressure.

7. The system according to claim 1,
wherein a backpressure regulator comprises:
a flow channel for the fluid flow of which the pressure is to be controlled, said flow channel having a cross sectional area,
a movable valve member, said moveable valve member being adapted to control the size of the cross sectional area of the flow channel in order to control the pressure of the fluid flow in the flow channel,
a valve actuator, said valve actuator being adapted to control the position of the valve member,
said valve actuator comprising a control chamber having a fluid under a reference pressure therein, said fluid engaging a pressure surface of the valve member for exerting a control force thereon, and a reference pressure controller, said reference pressure controller being adapted to control the reference pressure in said control chamber.

8. The system according to claim 7, wherein the reference pressure controller of the back pressure regulator comprises:

a first restrictor channel, said first restrictor channel having an inlet and an outlet, a second restrictor channel, said second restrictor channel having an inlet and an outlet, a fluid passage, which fluid passage extends between the outlet of the first restrictor channel and the inlet of the second restrictor channel, said fluid passage allowing fluid communication between the first restrictor channel and the second restrictor channel, a pressure control fluid source, said pressure control fluid source being adapted to provide a flow of pressure control fluid through the first restrictor channel, the fluid passage and the second restrictor channel, said flow of pressure control fluid having an entrance pressure at the inlet of the first restrictor channel and an exit pressure at the outlet of the second restrictor channel, said entrance pressure being higher than said exit pressure, said flow of pressure control fluid experiencing a first pressure drop $\Delta p1$ over the first restrictor channel and a second pressure drop $\Delta p2$ over the second restrictor channel, a connector connecting the fluid passage to the control chamber of the valve actuator, said connector being in fluid communication with said control chamber, the pressure control fluid at the connector having an intermediate pressure which is lower than the entrance pressure but higher than the exit pressure, said intermediate pressure being determined by the ratio between the first pressure drop $\Delta p1$ and the second pressure drop $\Delta p2$, and a controllable thermal device, said thermal device being adapted to heat and/or cool the first restrictor channel and/or the second restrictor channel, therewith influencing the ratio between the first pressure drop $\Delta p1$ and the second pressure drop $\Delta p2$, said thermal device comprising a thermal controller for controlling the thermal output of the thermal device.

9. The system according to claim 1, wherein the passive flow restrictors of the flow splitter are capillary tubes and/or channels in microfluidic chips.

10. The system according to claim 1, wherein the system further comprises a plurality of filters, each filter being arranged in a reactor effluent line downstream of a reactor outlet, and wherein each backpressure regulator is arranged downstream of such filter.

11. The system according to claim 1, wherein at least one flow-through reactor comprises a fixed bed.

12. The system according to claim 1, wherein the dilution line is arranged to feed pressurized purge fluid or pressurized dilution fluid into a reactor effluent line, or wherein at least one flow-through reactor comprises a fixed bed, and the dilution line is arranged to feed pressurized purge fluid or pressurized dilution fluid into said reactor downstream of the fixed bed and upstream of the reactor outlet of said reactor.

* * * * *